Oct. 31, 1967  L. S. MAYERS  3,350,045
ARTICLE HOLDER
Filed Aug. 17, 1966

INVENTOR.
LAWRENCE S. MAYERS

BY Howard C. Miskin
ATTORNEY

3,350,045
ARTICLE HOLDER
Lawrence S. Mayers, 281 Garth Road,
Scarsdale, N.Y. 10583
Filed Aug. 17, 1966, Ser. No. 572,933
8 Claims. (Cl. 248—205)

This invention relates to a holding device in general and more particularly relates to a device for holding an article or group of articles, such as a plurality of papers, on any convenient surface, such as a wall or desk, and which provides a readily available article holder for papers and the like, which is easily transportable and movable and which can be fixedly positioned in place by application of a slight pressure.

It is a principal object of the present invention to provide an article holder, which can hold various thickness of sheets, such as papers and the like, securely and which can be affixed to any convenient vertical surface, such as a wall, by a single application of pressure.

It is a further object of the present invention to provide a self-adjusting article holder, which increases the holding force applied to the articles as the thickness of the articles increases, and which holder can be quickly and easily affixed to any convenient surface, including a vertical surface, and removed when desired, and reapplied to the same or a different surface.

A still further object of the present invention is to provide an article holder, which is one piece, durable, and which can be easily modified or shaped to meet specific uses of the user, and which can be readily affixed to any convenient surface, including a wall.

Another object of the present invention is to provide an article holder which can firmly hold various thickness of sheets of materials, such as papers, which holder is easy to manufacture and assemble, simple in construction, self-adjusting in exerting a holding force on the papers, which force increases as the thickness increases, easy to modify its shape and economical.

Other and more detailed objects of the present invention will be apparent from the following description of the preferred embodiments, as selected for illustration in the attached drawing, wherein.

Figure 1:
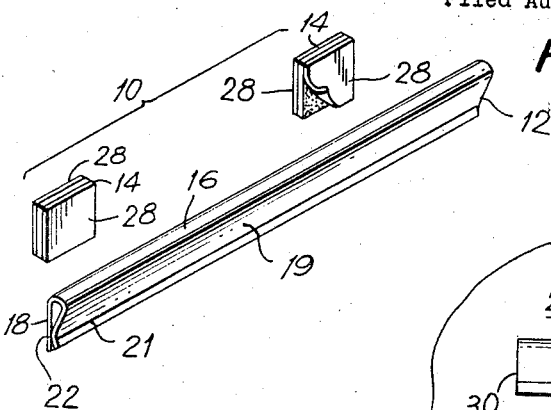
FIGURE 1 is an exploded, perspective elevational view showing the holder and attaching means prior to assembling.
Figure 2:
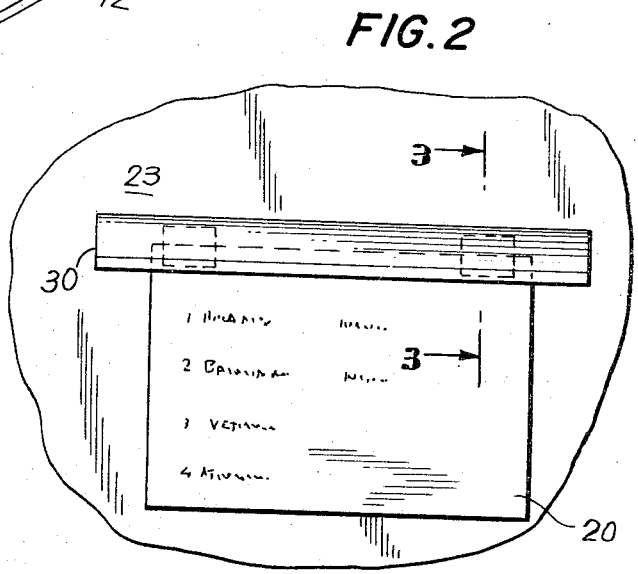
FIGURE 2 is a front elevational view showing the holder in use.

The drawing shows one form of the article holder in accordance with the present invention.

Figure 3:
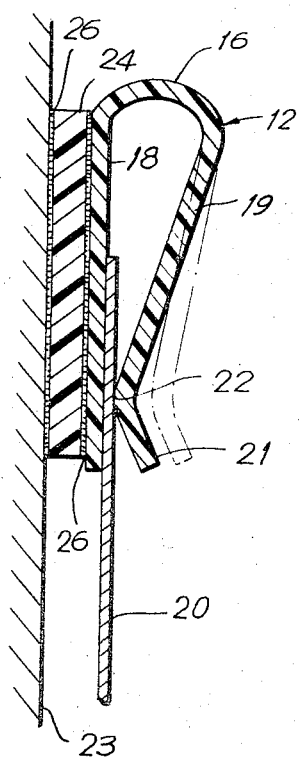
FIGURE 3 is an enlarged, cross-sectional view taken along line 3—3 of FIGURE 2.

Referring to FIGURES 1 and 3, an article holder 10 is shown having a one-piece gripping member 12 and a pair of attaching members 14. As shown, gripping member 12 is advantageously one piece and formed by extrusion having a base portion 16 and a pair of yieldable, flexible arms 18 and 19 integrally joined along opposite edges of base portion 16. Arms 18 and 19 extend downwardly from base or bight 16 and arm 19 also is directed toward arm 18. As shown, the free end of arm 19 has an outward flared edge 21, running the length of the arm. Arm 19 is urged against arm 18 along a line indicated at 22. As shown, arms 18 and 19 are yieldably urged together and are yieldably separated to insert articles therebetween, such as a piece of paper, cardboard or other sheet material indicated at 20. After insertion of article 20, arms 18 and 19 are biased inwardly gripping article 20 securely for holding it in position between them.

For attaching gripping member 12 to any surface, such as a wall 23, a pair of attaching members 14 are mounted along the outer surface of arm 18, as seen best in FIGURE 3. Attaching members 14, as shown, are pressure sensitive suspension members, having a supporting body 24, which is cellular in structure, so as to easily conform to any unevenness of the attaching surfaces, either wall 23 or arm 18, and is resilient. On each of opposite surfaces of body 24 is a pressure sensitive adhesive surface indicated at 26. To protect adhesive surfaces 26 prior to use, a backing sheet 28 covers each adhesive surface 26 and is easily peeled off when ready to use, so as to securely affix attaching members 14 to gripping member 12 and the surface to which it is attached, such as wall 23.

In use a predetermined length of gripping member 12 is selected. The length of gripping member 12 can be of any size, because of the extrusion process. Predetermined length for articles to be held, such as a group of letters or papers can be easily determined from use, and if necessary, a larger size can be cut to length. The longer the length, the greater the load capacity in suspending and holding the articles, such as paper 20. An attaching member 14 is selected of the desired length, which could either be one unit or a pair, as shown in FIGURE 1, and the backing sheet 28 on adhesive surface 26 is peeled away and attaching member 14 is mounted on the outer surface of arm 18 of gripping member 12. The opposite backing sheet 28 is peeled away exposing its corresponding adhesive surface 26 and the article holder 10 is forced and pressed against a convenient surface, such as wall 23. To insert the articles to be held, such as a group of papers, they are forced in along one vertical edge 30. The flared end 21 aids in inserting the sheets between arms 18 and 19. Arms 18 and 19 yieldably separate, such as shown in shadow in FIGURE 3, as the article 20 or a group of articles are slid in, and arm 19 returns to its engaging position securely holding the articles. Thus, an article holder is easily provided at any convenient surface, such as a kitchen, for holding bills and notes, in offices for holding newspapers, etc. To remove from the wall 23 the adhesive surface is merely peeled off wall 23 and can be forced against another surface, if desired.

Figure 4:
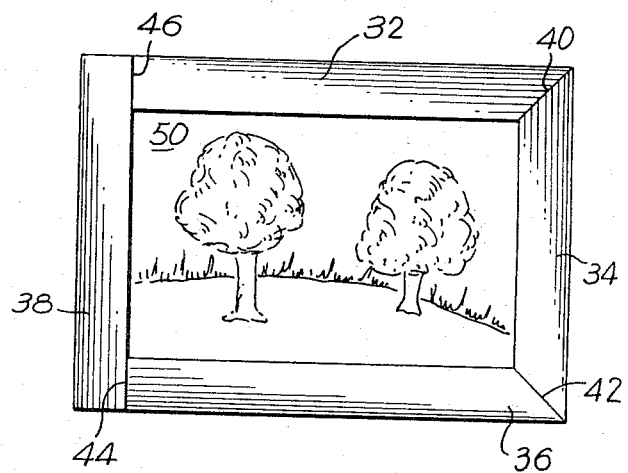
FIGURE 4 is a further embodiment showing a group of the article holders modified in shape and used in combination to form a picture frame.

A further embodiment of the present invention is shown in FIGURE 4, where a picture frame is formed from four lengths of a gripping member indicated at 32, 34, 36 and 38, respectively. The gripping members 32 and 34 abut along a line 40, which is shown at a 45° angle. Similarly, members 34 and 36 are joined along another 45° junction indicated at 42. As shown, junction 44 between members 36 and 38 and junction 46 between members 32 and 38 are shown as butt joints, which while not esthetically pleasing as the diagonal joints 40 and 42, are satisfactory for holding the picture 50.

Gripping member 12 is advantageously made of any material, which is flexible, light and strong, such as sheet steel and many of the plastics commonly used today, such as polypropylene, vinyl polymers and copolymers and others. With plastics, different bright colors can be used, so as to be quickly visible to the eye. It is essential that the arms 18 and 19 can take repeated stresses of opening and yieldably return to their unstressed position. This is important in order to maintain good gripping characteristics whether using single sheets or a group of sheets. The greater the width of base 16, the greater the number of sheets or width of articles to be held. With many plastics, the desired length can be cut easily from a long strip and the ends modified, such as forming a 45° angle.

While attaching member 14 has been shown to be separate and not attached to gripping member 12, one arm can be made with a strip of pressure sensitive material extending to full length, so as to be ready to be used upon removal of the package by the user.

Figure 5:
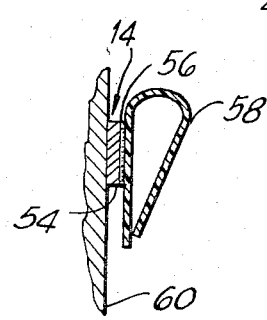
FIGURE 5 is a cross sectional view similar to FIGURE 3 showing a magnetic attaching member.

Further, attaching member 14 can contain or be a magnet, so as to quickly mount gripping member 12 to any iron or steel surface such as illustrated in FIGURE 5. Here, attaching member 14 comprises a magnet 54 having a pressure-sensitive adhesive surface 56 for affixing magnet 54 to the rear surface of a gripping member 58. Magnet 54 holds member 58 to a metal surface, such as a cabinet, wall, desk or the like.

With the foregoing explanation, it will be apparent to those skilled in the art that the present invention lends itself to the various types of article holders and that various changes may be made in the design and arrangement of parts or the material or construction, without departing from the spirit or scope of this invention, which is expressed in the appended claims.

What is claimed is:

1. An article holder to be attached to a surface, comprising an elongated base and a pair of flexible arms extending downwardly from opposite longitudinal edges of said base for the length of said base and defining a bight therebetween, at least one of said arms directed inwardly towards the other arm, so that said arms yieldingly abut along a line remote from said bight, and surface attaching means carried by the rear surface for attachment to said surface, said arms being separable in response to insertion of said article into said bight for applying a pressure to opposite sides of said article so as to hold said article between said arms hanging downwardly, said applied pressure increasing in proportion to the thickness of said article.

2. An article holder as set forth in claim 1, wherein said base and arms are extruded in one piece.

3. An article holder as set forth in claim 1, wherein one of said arms has an outwardly flared longitudinal edge.

4. An article holder as set forth in claim 1, wherein said attaching means is resilient and pliable to readily conform to any attaching surface unevenness, and has a pressure sensitive coating on its outer surface.

5. An article holder as set forth in claim 4, wherein said attaching means has pressure sensitive adhesive on pressure sensitive adhesive.

6. An article holder as set forth in claim 5, further including a sheet removably covering each of said adhesive surfaces until ready to use.

7. An article holder as set forth in claim 1, wherein said arms are biased inwardly so that the greater the separation, the greater the force exerted on said arms to return to abutting relation, so as to securely clamp anything therebetween.

8. An article holder as set forth in claim 2, wherein said attaching member includes a magnet.

References Cited

UNITED STATES PATENTS

| | | | |
|---|---|---|---|
| 2,470,811 | 5/1949 | Engleman | 24—81 |
| 2,492,411 | 12/1949 | Barnes et al. | 248—29 |
| 2,644,212 | 7/1953 | Markowitz | 24—201 |
| 2,959,832 | 11/1960 | Baermann | 24—201 |
| 3,015,869 | 1/1962 | Rapata | 24—213 |
| 3,016,224 | 1/1962 | Hall | 248—205 |
| 3,074,677 | 1/1963 | Eckhardt | 248—205 |
| 3,118,207 | 1/1964 | Breslon | 248—206 |
| 3,190,599 | 6/1965 | Margulis | 248—205 |
| 3,239,178 | 3/1966 | Pompa | 248—205 |

ROY D. FRAZIER, *Primary Examiner.*

CLAUDE A. LE ROY, *Examiner.*

J. F. FOSS, *Assistant Examiner.*